July 24, 1962 S. T. WILLIAMS 3,045,704
FLUID PRESSURE RESPONSIVE ACTUATING MEANS
Filed Nov. 23, 1960
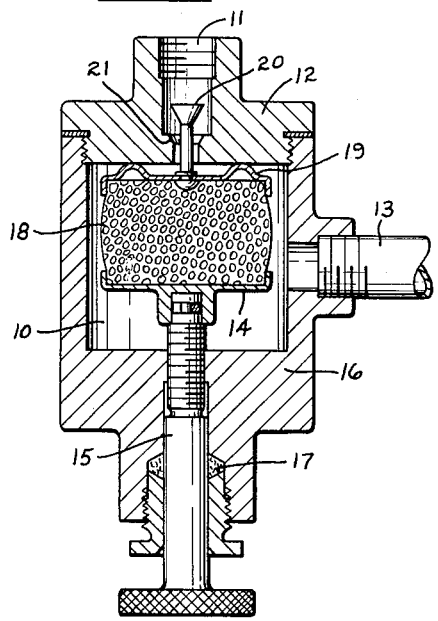
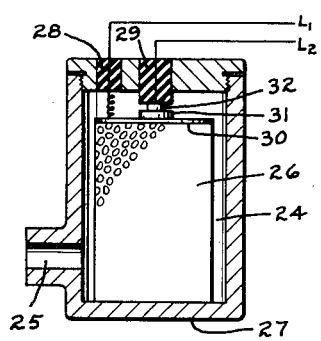
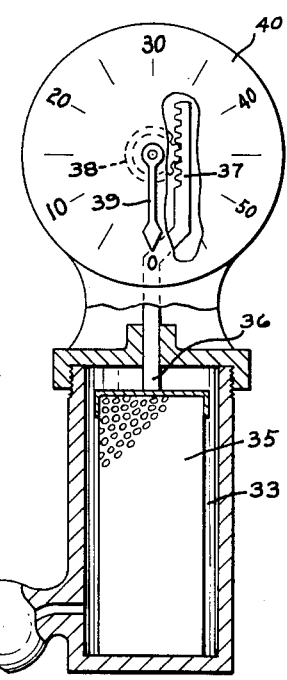
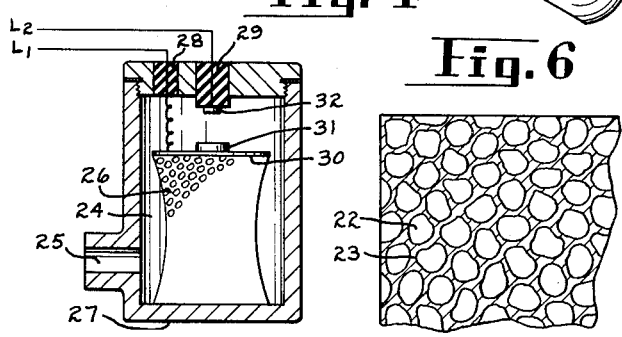
INVENTOR
Selden T. Williams
BY
H. F. Johnston
ATTORNEY

United States Patent Office 3,045,704
Patented July 24, 1962

3,045,704
FLUID PRESSURE RESPONSIVE ACTUATING MEANS
Selden T. Williams, Middlebury, Conn., assignor to Scovill Manufacturing Company, Waterbury, Conn., a corporation of Connecticut
Filed Nov. 23, 1960, Ser. No. 71,320
10 Claims. (Cl. 137—793)

My invention relates to actuating means responsive to changes of fluid pressure. It may also be called a mechanical energy transducer which derives power from a surrounding fluid pressure medium and supplies power to move an element or part to be actuated. The movement of such part or element is accomplished solely by dimensional change in a compressible cellular body through direct transfer of energy from the pressure transmitting medium.

Such a transducer or actuating means is useful in a variety of pressure responsive controls, including pressure switches, pilot valves, pressure relief valves and gauges. The invention is also adaptable to thermostatic responsive controls by the use of a thermally expansible medium either integral with the device or remote therefrom and connected thereto through tubing.

In pressure responsive devices, it is common to employ pistons, diaphragms, Bourdon tubes or bellows arrangements but there are many objections to such prior devices. One difficulty is in obtaining a reliable seal between the pressure fluid and the movable parts attached to it. Other difficulties are caused by friction between the parts and by sticking together of the parts. This is especially true after long periods of non-use.

The general object of my invention is to overcome such numerous difficulties without resort to a complicated or relatively high cost construction.

Another object is to provide an improved device of the kind described which shall be highly sensitive to fluid pressure variations and whose movements are proportional to such pressures so that the device can be closely controlled or calibrated.

Still another object is to provide an improved pressure responsive actuator which is exceedingly simple and low in cost and which can be easily incorporated into a wide variety of control devices, whether or not the size is large or small.

My invention utilizes a property in a closed cell gas-expanded elastomer, such as foam rubber (either natural or synthetic) or foamy elastic plastic materials. This is the property of a block, body or mass of such material to expand or contract in size or over-all dimensions as the pressure of the fluid medium surrounding such body of material is decreased or increased. This is a volumetric change following closely Boyle's law ($PV=pv=C$) within practical limits.

Furthermore, a mass or body of this material, although elastic in nature, has a certain degree of structural stability as distinguished from a rubber bladder or even a bellows, and according to my invention, it is placed directly in the fluid pressure medium and itself serves as a mechanical transducer to actuate an element or part connected to or bearing against such body or mass.

In another sense, it is self-supporting as distinguished from a diaphragm. In many cases, it can serve by itself as its own spring, although in other cases, it may be preloaded by a spring or pressure plate.

Other objects and advantages of the invention will readily appear to those skilled in the art to which the invention pertains. In the drawing, I have shown for purposes of illustration, three embodiments which the invention may assume in practice.

In the drawing:
FIG. 1 is a central sectional view through a pressure regulator valve embodying my invention;
FIG. 2 is a similar view, with the lower part broken away, of the valve shown in FIG. 1 but in a different position;
FIG. 3 is a diagrammatical view of a pressure switch in closed position;
FIG. 4 is a similar view showing the switch in open position;
FIG. 5 illustrates the application of my invention to a pressure gauge; and
FIG. 6 is a fragmentary sectional view showing the nature of the foam material used in my invention.

In the application of my invention to a pressure regulator shown in FIGS. 1 and 2, a hollow chamber 10 is interposed in a pressure fluid flow line having an inlet 11 leading through the removable top wall 12 of the chamber and an outlet 13 leading from the cylindrical sidewall of the chamber. Inside the chamber 10 is a supporting plate 14 which is adjustable inwardly and outwardly by a screw stem 15 threaded through the bottom wall 16 of the chamber. Leakage around the stem can be prevented by suitable packing 17. Upon the plate 14 is mounted a cylindrical block or body 18 of foam rubber and resting on the upper surface of the foam rubber block is an actuating plate 19 carrying a valve 20 movable toward and away from a valve seat 21.

In each of the devices to be described, the mass or body of elastomeric material will be referred to as foam rubber for the sake of brevity. It is understood that this term is intended to include any elastomeric material consisting of a multiplicity of integrally united elastically walled and hermetically closed gas-containing cells. In FIG. 6, a section through such a body of material shows cells 22 of various shapes but all connected by thin elastic walls 23. The size and number of such cells, and thus the density and weight of the material, may be varied over a wide range depending upon the functions to be performed. The less dense bodies can be employed where the part to be manipulated is light in weight and where it is desired to have a high degree of sensitivity to pressure changes, especially when dealing with relatively low pressures. Conversely, a more dense material will be employed when dealing with higher pressures or where the part to be manipulated is relatively heavier.

In the condition shown in FIG. 1, the actuating plate 19 is abutting against the top wall 12 of the chamber, and the block 18 may be placed under the desired degree of initial compression by the adjusting stem 15. FIG. 2 shows the regulator in action where the pressure in the chamber has risen to the desired outlet pressure, thus shrinking the size of the foam rubber body 18 in all directions. In particular, the upper surface of this body has moved downwardly toward the stationary bottom surface which rests on the plate 14. This has caused the valve 20 to move toward the valve seat 21 and restrict the flow accordingly. By proper adjustment of the screw stem 15, the valve will move from open to a restricted position so as to control the flow from the inlet 11 to the outlet 13 and maintain the desired outlet pressure.

FIGS. 3 and 4 show diagrammatically how the invention may be applied to a pressure switch. Here there is a hollow chamber 24 in communication with the fluid pressure medium from the inlet 25 and the foam rubber block 26 is supported directly by the bottom wall 27 of the chamber. Electrical connections from $L_1$ and $L_2$ extend through suitable insulating blocks 28 in the top wall 29 of the chamber, one being connected to the plate 30 carrying a contact 31 and the other to the stationary contact 32.

It will be understood that if desired, the foam rubber block 26 may also be placed under initial compression and an adjustment may be provided as in the case of the regulator valve shown in FIGS. 1 and 2. In any case, when the pressure has risen above a predetermined amount, the foam rubber block will be compressed and shortened so as to move the contacts apart and open the switch.

FIG. 5 shows the application of the invention to a pressure gauge where again there is a hollow chamber 33 which may be subjected to pressure through a suitable connecting chuck 34. In this case, the relatively long foam rubber block 35 may be attached as by suitable adhesive to the bottom wall of the chamber. The opposing upper end surface of the block is attached to the actuated element which in this case is a stem 36 which may extend through a suitable packing gland in the top wall of the chamber and carry the rack 37 meshing with a gear 38. Attached to this gear may be a pointer 39, the movements of which are indicated along the dial 40 which can be calibrated to register the change in length of the foam rubber block 35 and thus register the pressure.

The dimensional changes in the foam rubber body, which are indicated in the drawings, are typical of what may be obtained. In FIG. 1, when the block 18 is placed under mechanical compression, it will tend to bulge outwardly as indicated by the curved outline of the sidewall. On a substantial increase in pressure, the body will shrink in length as indicated in FIGS. 2 and 4, and the sides will move inwardly along a concave line. This is especially true if the ends are secured to the support or actuator plate as by cement. Although it may be advantageous in some cases to take advantage of the crosswise dimensional change, it will usually be found preferable to utilize the endwise dimensional change upon variations in pressure as in each of the instances shown in the drawings.

As stated above, the expansion or contraction of the length, for example, of such a body follows closely to Boyle's law within practical limits. The dimensional change is not strictly a linear function of the pressure changes. This is due, of course, to the mechanical or structural strength of the body which becomes more of a factor as the pressure increases but within certain limits which may be utilized to actuate such devices as have been referred to, the dimensional change is sufficiently close to being proportional to the pressure change that its performance can be predicted or easily determined empirically.

The advantages which my invention brings to the wide family of devices which are classed generally as fluid pressure responsive actuating means, will be evident. It is only necessary to select a suitable piece of closed cell elastomeric material (such as foam rubber) and place it on a suitable supporting surface directly in contact with the fluid pressure medium. Its own movements are utilized to actuate the desired movable element, thus eliminating the need for mechanisms such as required in former devices of this character.

It will also be apparent such a piece of material retains its sensitivity over long periods of use or non-use. The elastic walls of the closed cell material are not subjected to bursting stresses because the pressure inside such cells changes automatically with the outside pressure.

While the drawing illustrates three embodiments of the invention, many other devices and variations to which the invention is applicable will be readily appreciated.

What I claim is:

1. Fluid pressure responsive actuating means comprising a support, an elastomeric body consisting of a multiplicity of integrally united elastically walled and hermetically closed gas-containing cells mounted on said support, an actuator connected to said elastomeric body in spaced relation to said support, whereby changes in fluid pressure surrounding and in direct contact with said body will vary such spaced relation to move said actuator in response to such fluid pressure changes.

2. In a mechanical actuating device, a body of elastomeric material consisting of a multiplicity of integrally united elastically walled and hermetically closed gas-containing cells, means for retaining said body in direct contact with a variable fluid pressure medium, whereby changes in pressure of such medium causes dimensional variations of said body approximately in accordance with Boyle's law ($PV=pv=C$) and actuable means associated with said body and movable with such dimensional variations in said body.

3. Fluid pressure responsive actuating means for controlling switches, valves, gauges or the like, comprising a chamber adapted for communicating with a source of variable fluid pressure, a unitary mass of foam rubber disposed in said chamber, means for holding a portion of such mass in fixed relation to said chamber, and an actuator supported by and movable with another portion of such mass in response to fluid pressure variations within said chamber.

4. Fluid pressure actuating means as defined in claim 3 wherein said mass has opposed surfaces movable toward one another on increase of pressure and away from one another on decrease of pressure in said chamber, means for attaching one of such surfaces to the chamber, and means for attaching the actuator to the other of such surfaces.

5. A mechanical transducer comprising a self-supporting body of elastomeric material consisting of a multiplicity of integrally united elastically walled and hermetically closed gas-containing cells, means for holding said body in a fluid pressure medium, and an element to be actuated by movement of said body in response to fluid pressure variations.

6. A mechanical transducer comprising a stationary hollow chamber in communication with a variable fluid pressure medium, and a body of elastomeric material consisting of a multiplicity of integrally united elastically walled and hermetically closed gas-containing cells in said chamber and having one stationary surface supported interiorly of said chamber and an opposing surface free to move within said chamber.

7. A mechanical transducer comprising a stationary hollow chamber in communication with a variable fluid pressure medium, a body of elastomeric material consisting of a multiplicity of integrally united elastically walled and hermetically closed gas-containing cells in said chamber and having one stationary surface in contact with an interior wall of said chamber and an opposing surface free to move within said chamber, and a part to be actuated connected to said movable surface of the elastomeric body.

8. A transducer as defined in claim 7 wherein the element to be actuated includes a part which projects to the outside of said chamber.

9. Fluid pressure responsive actuating means comprising a chamber subjected to varying fluid pressure, a movable support inside said chamber and means projecting to the outside of said chamber for moving said support, a block of foam rubber material fixed to said movable support at one end of said body with the other end free to move endwise within limits in said chamber, and a movable element supported by said movable end so as to be actuated back and forth by said elastomeric body upon variations in the fluid pressure in said chamber.

10. Fluid pressure responsive actuating means as defined in claim 9 wherein said movable element is a valve co-operating with a valve seat carried by a wall of said chamber and wherein said means for moving said support is adapted to place said block under initial compression so that said movable element will not be actuated until a predetermined pressure is reached in said chamber.

References Cited in the file of this patent
UNITED STATES PATENTS

| | | |
|---|---|---|
| 2,509,685 | Hughes | May 30, 1950 |
| 2,704,551 | Ralston | Mar. 22, 1955 |
| 2,855,951 | Orth | Oct. 14, 1958 |
| 2,944,125 | Oliveau | July 5, 1960 |

UNITED STATES PATENT OFFICE
CERTIFICATE OF CORRECTION

Patent No. 3,045,704                          July 24, 1962

Selden T. Williams

It is hereby certified that error appears in the above numbered patent requiring correction and that the said Letters Patent should read as corrected below.

Column 5, line 3, for "body" read -- block --; line 6, for "elastomeric body" read -- block of foam rubber material --.

Signed and sealed this 22nd day of January 1963.

(SEAL)
Attest:

ERNEST W. SWIDER
Attesting Officer

DAVID L. LADD
Commissioner of Patents